Sept. 19, 1961     C. C. HOTTENSTEIN     3,000,254
EXPANSION BOLT MEANS WITH THREAD MEANS TO COUPLE
THE EXPANSION SHELL TO THE BOLT
Filed Oct. 4, 1957     2 Sheets-Sheet 1

INVENTOR
Carl C. Hottenstein
BY Natt M'Emery Jr.
ATTORNEY

Sept. 19, 1961 C. C. HOTTENSTEIN 3,000,254
EXPANSION BOLT MEANS WITH THREAD MEANS TO COUPLE
THE EXPANSION SHELL TO THE BOLT
Filed Oct. 4, 1957 2 Sheets-Sheet 2
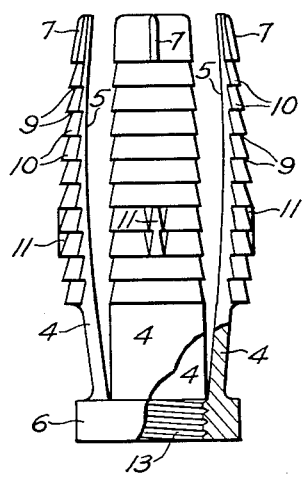
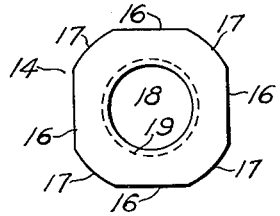
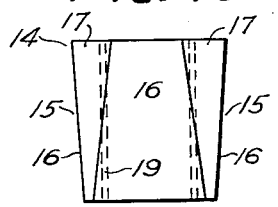
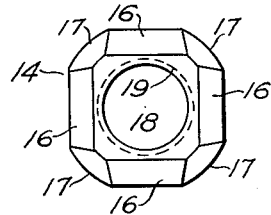
INVENTOR
Carl C. Hottenstein
BY Natt M Emery Jr.
ATTORNEY

United States Patent Office 3,000,254
Patented Sept. 19, 1961

3,000,254
EXPANSION BOLT MEANS WITH THREAD MEANS TO COUPLE THE EXPANSION SHELL TO THE BOLT
Carl C. Hottenstein, Richland, Pa., assignor to Bethlehem Steel Company, a corporation of Pennsylvania
Filed Oct. 4, 1957, Ser. No. 688,369
3 Claims. (Cl. 85—2.4)

This invention relates in general to anchoring devices, and more particularly to expansion bolt assemblies which have special advantages for use as mine roof anchoring devices.

My invention resides in the novel construction, combination and relation of the various parts hereinafter described and shown in the specifications, claims and drawings.

The well-known type of expansion bolt assembly comprising a bolt screwed into a wedge nut and thereby expanding a split sleeve or shell, has the fundamental disadvantage that either the bolt or the nut must usually be provided with additional special attaching elements to hold the shell in place on the bolt during insertion of the assembly into a hole in a mine roof. In their usual forms, these additional elements can easily become separated and mislaid, which may result in considerable extra cost and delay. The shell itself must be capable of being expanded into very firm, tight and strong engagement against the inner walls of the hole into which it is inserted.

One object of the present invention, therefore, is to provide an expansion bolt having an expansible shell comprised of outwardly bowed leaves which will afford a spring-like expanding action and firm and definite contact at a plurality of points on the surrounding wall of the hole.

Another object is to provide an expansion device in which the shell is held in place on the bolt without need of special attaching elements.

A further object is to provide an expansion device including a wedge nut with maximum bearing area on its shell-engaging faces.

Still another object is to provide an expansion device which is economical to make and reliable in operation.

Figure 1:
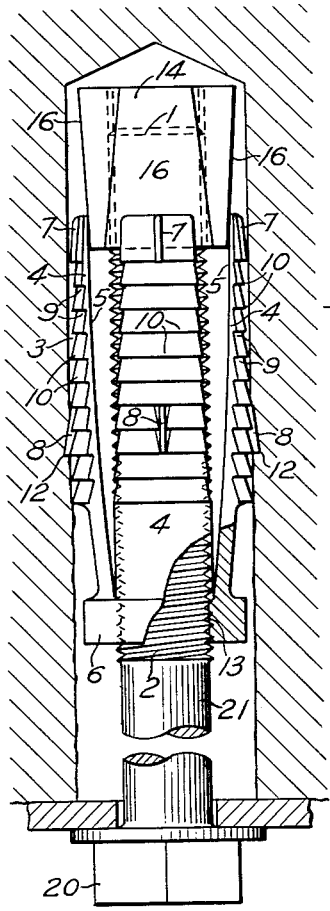
Figure 2:
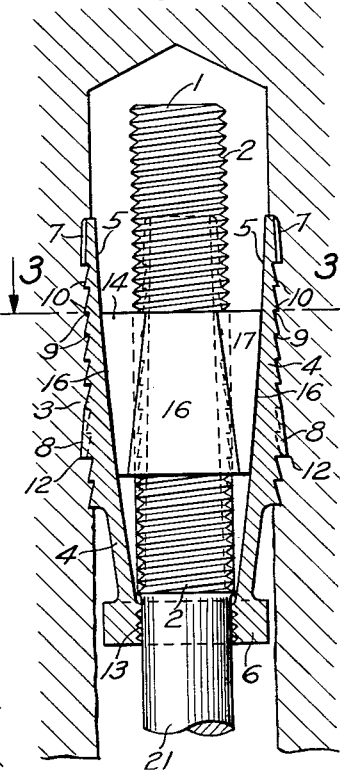
Figure 3:
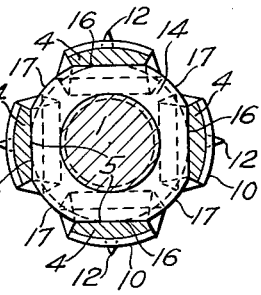
Figure 6:
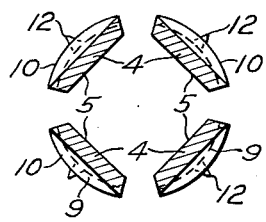
Figure 5:
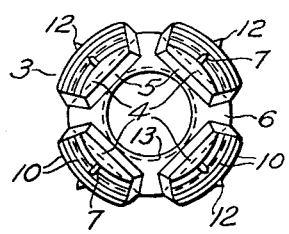
Figure 7:
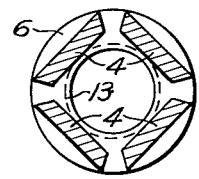
Figure 4:
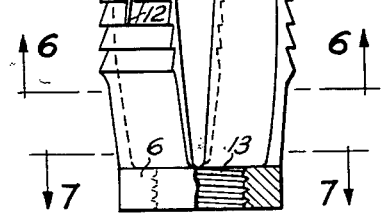

Additional objects, purposes and advantages of the invention will appear hereinafter in the description and claims and in the appended drawings, in which:

FIG. 1 is a side elevation showing the device in its initial position;
FIG. 2 shows the device in the expanded position with the shell shown in section;
FIG. 3 is a section taken along line 3—3 of FIG. 2;
FIG. 4 is another view of the expansion shell shown partly in section;
FIG. 5 is a top plan view of the shell;
FIG. 6 is a section through the shell taken along line 6—6 of FIG. 4;
FIG. 7 is a section through the shell taken along line 7—7 of FIG. 4;
FIG. 8 is a view in elevation of an alternative type of shell having the longitudinal lugs ground flush with the outer edges of the ribs;
FIG. 9 is a top plan view of the wedge nut;
FIG. 10 is a front view of the wedge nut; and
FIG. 11 is a bottom view of the wedge nut.

Referring now to the drawings, there is shown in the figures a mine roof expansion bolt assembly embodying the invention. The bolt 1 is provided with threads 2. The threads 2 are so formed that the crests project beyond the shank 21 of the bolt 1. This can be done by forming the threads in a thread rolling operation or by forming the bolt with an upset end.

The expansible portion of the assembly consists of a substantially circular expansible shell 3. Said shell 3 has four leaves 4 which are shown longitudinally bowed outwardly and are provided with transverse straight inner surfaces 5. The leaves extend the entire length of the shell 3 except for that portion which comprises the ring 6 at the base of the shell. The ring 6 and the four leaves 4 of the shell are formed as an integral unit.

The outer surfaces of the leaves 4 of the shell 3 can be straight but are preferably bowed longitudinally. Bowed leaves exert greater pressure against the surrounding mine roof hole than straight leaves while being expanded.

To keep the shell from turning in the hole, the uppermost ends of the leaves 4 can be provided on their outer faces with a plurality of short longitudinal lugs 7, and/or a similar short longitudinal lug 8 may be provided at the approximate longitudinal mid-section of each of the leaves 4. To prevent longitudinal movement and rotation of the shell within the hole a series of circumferentially disposed grooves 9 and sharp ribs 10 can be provided on the shell 3. Said grooves 9 and sharp ribs 10 can be used alone or they may complement the short longitudinal lug 8 on each of the leaves 4. In the event that the grooves 9 with sharp ribs 10 are used in conjunction with the lugs 8 at the longitudinal mid-section of each of the leaves 4, said lugs 8 may be flush as at 11 with the uppermost portions of said ribs 10 or they may extend slightly above (as at 12) said uppermost portion of said ribs 10.

The ring 6, according to my invention, is capable of being screwed onto the threaded portion of bolt 1, and also capable of sliding freely on the unthreaded shank 21 of bolt 1. If bolt 1 has rolled threads, this may be accomplished by making the hole in ring 6 slightly larger than the diameter of the unthreaded shank 21 of bolt 1 and by tapping the ring with about a 50% thread having flattened crests. If the end of bolt 1 is upset before threading, the threads on ring 6 may be cut more fully.

The wedge nut 14 is substantially square in transverse section with a slight taper 15 from top to bottom on its four plane bearing surfaces 16, and preferably has rounded corners 17 which lie on the surface of an inverted cone with the largest part of the cone being at the uppermost portion of the wedge nut 14. The four plane bearing surfaces 16 complementarily engage the smooth plane interior surfaces 5 of the leaves 4 of the shell 3.

A vertical hole 18 is provided at the center of said wedge nut 14. The wall of the hole 18 in the wedge nut 14 is provided with threads 19 in the same manner as the aforementioned bolt and the ring 6 at the base of the shell 3, i.e. the bolt 1, ring 6 and wedge 14 are all of the same hand.

For insertion in a mine roof hole, the structure should be assembled in the manner shown in FIGURE 1. This is most easily accomplished by screwing the shell 3 onto and past the threaded portion 2 of bolt 1, after which the wedge nut 14 is screwed onto the threaded portion 2 of the bolt 1 for a short distance. Then the shell 3 is raised a distance sufficient to bring the bearing surfaces 16 of the wedge 14 and the bearing surfaces 5 of the leaves 4 into engagement. The shell 3 and wedge 14 are then rotated until the threaded portion 13 of the ring 6 engages the threaded portion 2 of the bolt 1, thereby causing the shell 3 to be supported by the bolt 1.

The structure is now ready for installation into a drilled mine roof hole. This is accomplished by inserting the structure into the hole with the wedge nut end being the first portion to enter the hole. The head 20 of the bolt 1 is then rotated. Turning of the bolt head 20 causes the wedge nut 14 and shell to move downward on the bolt as a unit, until the ring 6 moves past the last thread and becomes disengaged from the threaded portion 2 of the bolt. Thereafter, as the bolt is rotated, the wedge moves downward into the shell thereby expanding the leaves and firmly anchoring the assembly in the mine roof hole.

It will be seen that the objects of this invention have been fully and effectively accomplished. However, it will be realized that various changes may be made in the specific embodiments disclosed to illustrate the principles of this invention without departing from such principles. Therefore, this invention includes all modifications which are encompassed by the spirit and scope of the following claims.

I claim:

1. An anchoring device comprising a bolt having a threaded portion of one hand throughout its length and an unthreaded portion, the crests of the threads extending above the surface of said unthreaded portion, a threaded wedge nut on said bolt, an expansion shell including a plurality of leaves engaging said wedge nut and an interiorly threaded ring, the interior of said ring being larger in diameter than the unthreaded portion of said bolt, said ring being in threaded engagement with the threaded portion of said bolt when said shell is in the unexpanded condition, and said ring being receivable on the unthreaded portion of said bolt when said shell is in the expanded condition.

2. An anchoring device comprising a threaded wedge having plane exterior side bearing surfaces, a bolt having a threaded portion which is of one hand throughout its length and an unthreaded portion, the crests of the threads extending above the surface of said unthreaded portion, an expansible anchoring shell, said shell having a plurality of leaves and a circumferentially continuous ring integral therewith at the lowermost end of said shell when said shell is in the unexpanded condition, said ring being receivable on said unthreaded portion of said bolt when said shell is in the expanded condition, said leaves of said shell having plane inner faces and working in complementary engagement with the bearing surfaces of the aforementioned wedge, the circumferential interior of said ring having threads with the crests thereof substantially reduced in height so that the ring will move freely on the unthreaded portion of the aforementioned bolt, said ring and the aforementioned bolt and wedge working in complementary and threaded engagement.

3. An expansible anchoring device assembly comprising a bolt, a wedge nut, and an expansible shell, said bolt having a head and a shank, said shank having an unthreaded portion and a portion having complete threads of one hand throughout its entire length, said unthreaded portion of said shank having a diameter substantially that of the pitch diameter of said threads, said wedge nut having plane exterior bearing faces and having complete internal threads complementary to the threaded portion of said bolt, said expansible shell having an internally threaded circumferentially continuous ring integral with a plurality of longitudinal expansible leaves, the threads of said ring being complementary to the threaded portion of the said bolt and being truncated for slidable engagement with the unthreaded portion of said bolt, said leaves of said shell having plane inner bearing surfaces for engagement with the exterior plane bearing surfaces of said wedge nut, said assembly in the unexpanded condition having the said continuous ring of said shell disposed on the threaded portion and adjacent to the unthreaded portion of said bolt with said wedge nut disposed on the threaded portion of said bolt and between the unexpanded leaves of said shell, said assembly in the expanded condition having the said continuous ring of said shell disposed on the unthreaded portion of said bolt when said wedge nut disposed on the threaded portion of said bolt and between the expanded leaves of said shell.

References Cited in the file of this patent

UNITED STATES PATENTS

| 674,074 | Bennett | May 14, 1901 |
| 932,398 | Kenney | Aug. 24, 1909 |
| 1,153,797 | Kegreisz | Sept. 14, 1915 |
| 1,964,427 | Chandler | June 26, 1934 |
| 2,602,365 | Ditson | Aug. 8, 1952 |
| 2,625,071 | Lewis | Jan. 13, 1953 |
| 2,639,179 | Phelps | May 19, 1953 |

FOREIGN PATENTS

| 454,771 | Italy | Feb. 1, 1950 |
| 444,623 | Great Britain | Mar. 23, 1936 |

UNITED STATES PATENT OFFICE
CERTIFICATE OF CORRECTION

Patent No. 3,000,254            September 19, 1961

Carl C. Hottenstein

It is hereby certified that error appears in the above numbered patent requiring correction and that the said Letters Patent should read as corrected below.

Column 4, line 28, for "when" read -- with --; line 39, for "Aug. 8, 1952" read -- July 8, 1952 --.

Signed and sealed this 13th day of February 1962.

(SEAL)
Attest:

ERNEST W. SWIDER
Attesting Officer

DAVID L. LADD
Commissioner of Patents